United States Patent
Jamison et al.

(10) Patent No.: US 12,007,286 B2
(45) Date of Patent: *Jun. 11, 2024

(54) SELF-CLEANING THERMOMETER FOR USE IN A MUD PIT

(71) Applicant: Halliburton Energy Services, Inc., Houston, TX (US)

(72) Inventors: Dale E. Jamison, Houston, TX (US); Andrew Vos, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 15 days.

This patent is subject to a terminal disclaimer.

(21) Appl. No.: 17/973,016

(22) Filed: Oct. 25, 2022

(65) Prior Publication Data

US 2024/0133754 A1 Apr. 25, 2024

(51) Int. Cl.
G01K 13/02 (2021.01)
B08B 1/12 (2024.01)
(Continued)

(52) U.S. Cl.
CPC ............ G01K 13/026 (2021.01); B08B 1/12 (2024.01); B08B 1/20 (2024.01); B08B 13/00 (2013.01); E21B 21/01 (2013.01); G01K 1/08 (2013.01)

(58) Field of Classification Search
CPC ...... E21B 12/06; B01D 21/30; G01K 13/026; B08B 1/20; B08B 1/12; B08B 13/00; B08B 3/04; B08B 3/12
See application file for complete search history.

(56) References Cited

U.S. PATENT DOCUMENTS 4,771,772 A 9/1988 DeWitt
2001/0028865 A1 10/2001 Cummings et al.
(Continued)

FOREIGN PATENT DOCUMENTS

CN 205200007 U 5/2016
CN 208495061 U 2/2019
(Continued)

OTHER PUBLICATIONS

Foreign Communication from Related Application—International Search Report and Written Opinion of the International Searching Authority, International Application No. PCT/US2023/029821, dated Nov. 21, 2023, 9 pages.

(Continued)

Primary Examiner — Shay Karls
(74) Attorney, Agent, or Firm — Conley Rose, P.C.; Rodney B. Carroll

(57) ABSTRACT

A self-cleaning temperature sensor comprises: a bellows coupled to a support structure; a pneumatic or hydraulic cylinder; a sensor configured to measure a temperature of a fluid and extending from the pneumatic or hydraulic cylinder, wherein the sensor comprises an exposure end configured to contact the fluid during sensing by the sensor; sensor wires connected with the sensor and extending to a control system; and a self-cleaning system comprising: a hood having walls extending radially outward a distance along a central axis wherein the hood defines a first volume; and a cleaning brush integrated with or adjacent the bottom of the support structure. In a retracted configuration, the exposure end of the sensor is positioned at a retracted position a distance from cleaning brush, and, in an extended configuration, the exposure end of the sensor extends a distance along the central axis away from the retracted position.

20 Claims, 6 Drawing Sheets

(51) Int. Cl.
    *B08B 1/20*      (2024.01)
    *B08B 13/00*    (2006.01)
    *E21B 21/01*    (2006.01)
    *G01K 1/08*     (2021.01)

(56) References Cited

U.S. PATENT DOCUMENTS

| | | |
|---|---|---|
| 2015/0138557 A1 | 5/2015 | Tjhang et al. |
| 2016/0018554 A1 | 1/2016 | Vigneaux |
| 2016/0025617 A1 | 1/2016 | Magnussen et al. |
| 2018/0045044 A1 | 2/2018 | Ye et al. |
| 2020/0109974 A1 | 4/2020 | Hill, III et al. |
| 2020/0230659 A1 | 7/2020 | Nabavi |

FOREIGN PATENT DOCUMENTS

| | | | |
|---|---|---|---|
| CN | 114086901 A | * | 2/2022 |
| CN | 116658084 A | * | 8/2023 |

OTHER PUBLICATIONS

Foreign Communication from Related Application—International Search Report and Written Opinion of the International Searching Authority, International Application No. PCT/US2023/029680, dated Dec. 1, 2023, 9 pages.

Filing Receipt, Specification and Drawings for U.S. Appl. No. 17/973,019, filed Oct. 25, 2022, entitled "Self-Cleaning Thermal Conductivity Sensor For Use in A Mud Pit," 40 pages.

\* cited by examiner

SELF-CLEANING THERMOMETER FOR USE IN A MUD PIT

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to wellbore drilling. More specifically, the present disclosure relates to measuring temperature of a circulating fluid (e.g., a drilling mud). Still more specifically, the present disclosure relates to a self-cleaning sensor for measuring the temperature of a circulating fluid (e.g., in a mud pit).

BACKGROUND

Thermometers utilized to monitor the temperature in a mud pit can become coated with gelled drilling fluid. In some applications, solids can build up to the point that the temperature measurement can become slow to react to temperature changes due to the insulating behavior of the gelled fluid. For event detection and real time data analysis, it is important to accurately and continuously monitor the mud pit temperature.

BRIEF DESCRIPTION OF TIE DRAWINGS

For a more complete understanding of this disclosure, reference is now made to the following brief description, taken in connection with the accompanying drawings and detailed description, wherein like reference numerals represent like parts.

Figure 3:
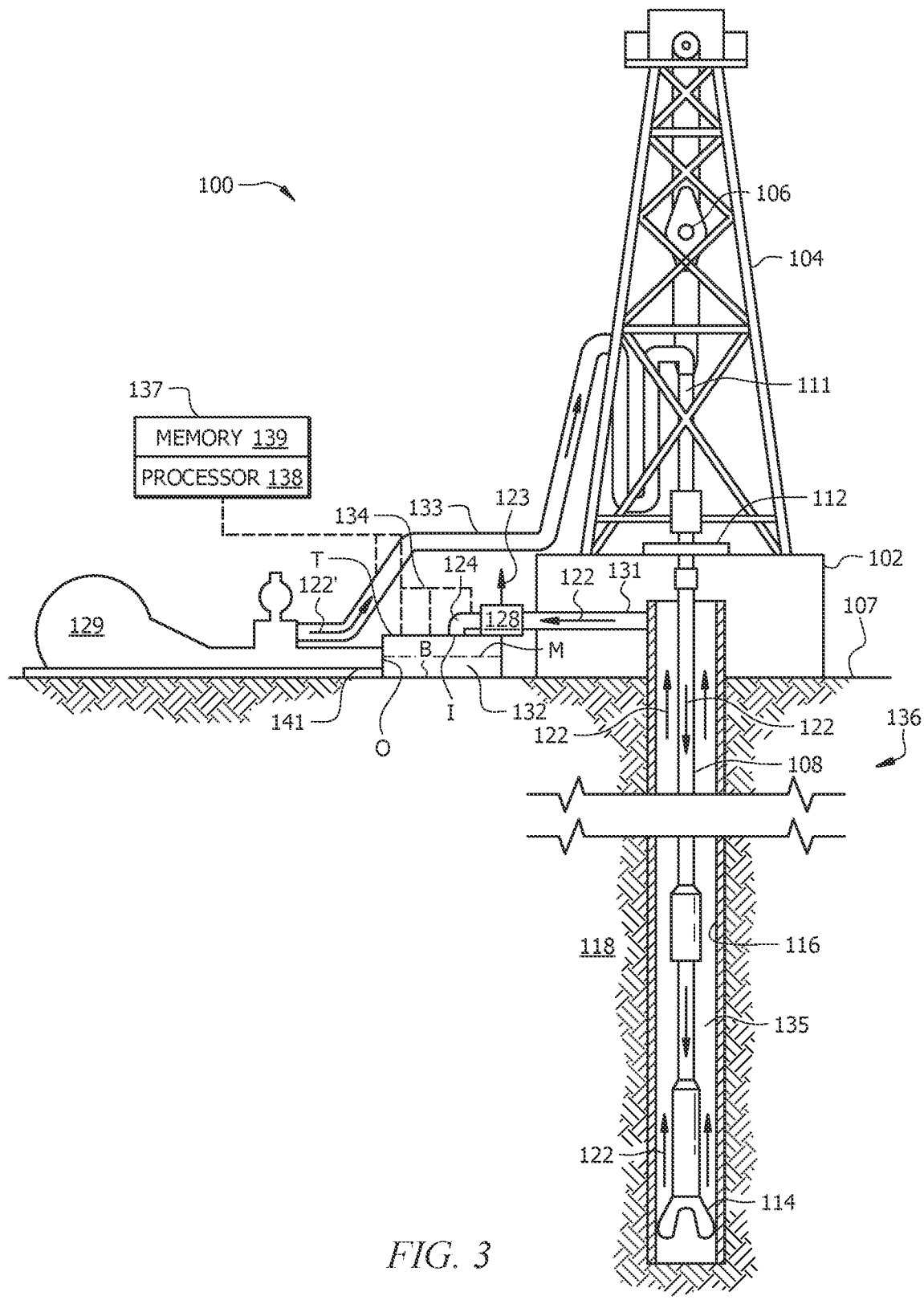
Figure 4A:
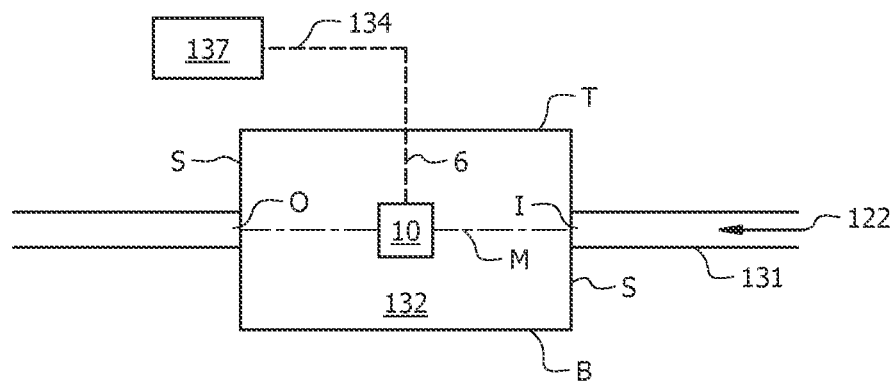
Figure 4B:
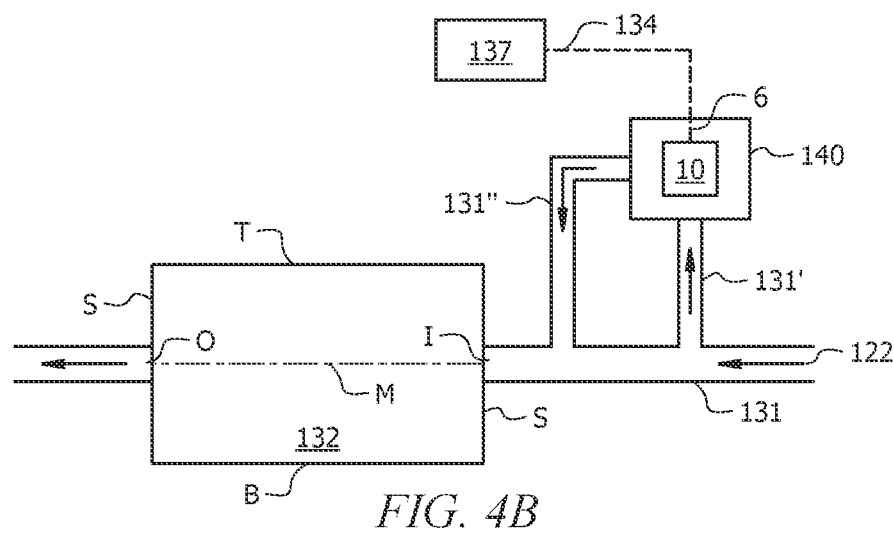
Figure 4C:
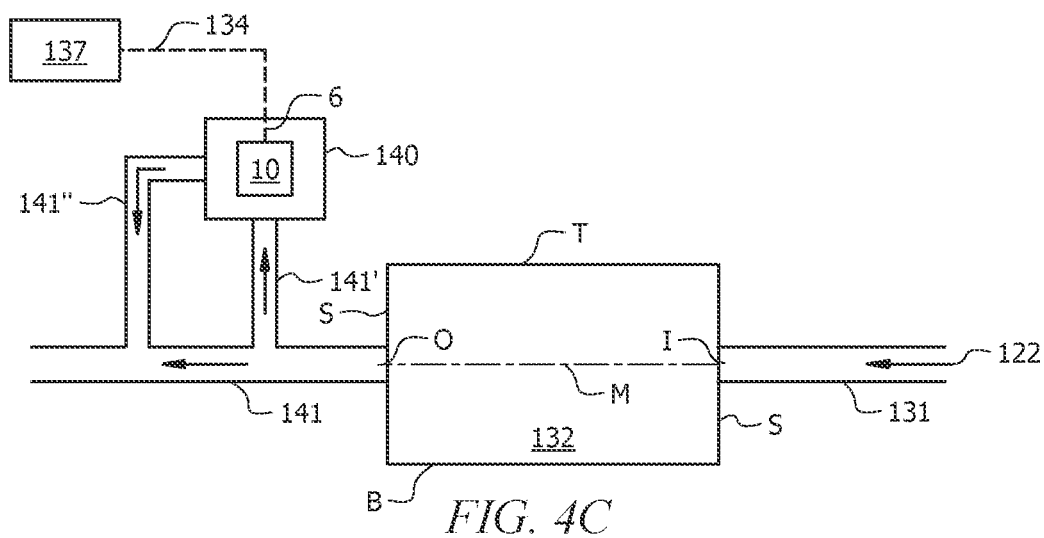

FIG. 3 provides an illustration of a drilling assembly with which the herein disclosed self-cleaning sensor can be utilized in embodiments described herein;

FIG. 4A is a schematic of a portion of a fluid circulation system comprising a self-cleaning sensor, according to embodiments of this disclosure;

FIG. 4B is a schematic of a portion of a fluid circulation system comprising a self-cleaning sensor, according to embodiments of this disclosure; and FIG. 4C is a schematic of a portion of a fluid circulation system comprising a self-cleaning sensor, according to embodiments of this disclosure.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, the phrase "coupled" indicates coupling of one component to another, either directly or indirectly. That is, a first component coupled to a second component can be coupled directly to the second component, or can be coupled indirectly to the second component, for example, via a third or more components.

Thermometers utilized to monitor the temperature of a circulating fluid, for example in a mud pit, can become coated with gelled circulating fluid (e.g., "drilling fluid" or "mud"). In applications, the circulating fluid can build up to a point at which the temperature measurement can become very slow to react to temperature changes, since the since the gelled circulating fluid can behave like an insulator. For event detection and real time data analysis, accurate and continuous monitoring of the temperature of the circulating fluid (e.g., the temperature of the circulating fluid entering circulation fluid pumps, the mud pit temperature) is desired.

As detailed hereinbelow, herein disclosed is a self-cleaning temperature sensor (also referred to herein simply as a "self-cleaning sensor") that provides for determining the substantially real time temperature of the circulating fluid (e.g., of the circulating fluid entering circulation fluid pumps, e.g., the mud pit temperature), and also provides for self-cleaning and gel breaking to ensure the measured temperature is accurately represented.

Figure 1A:
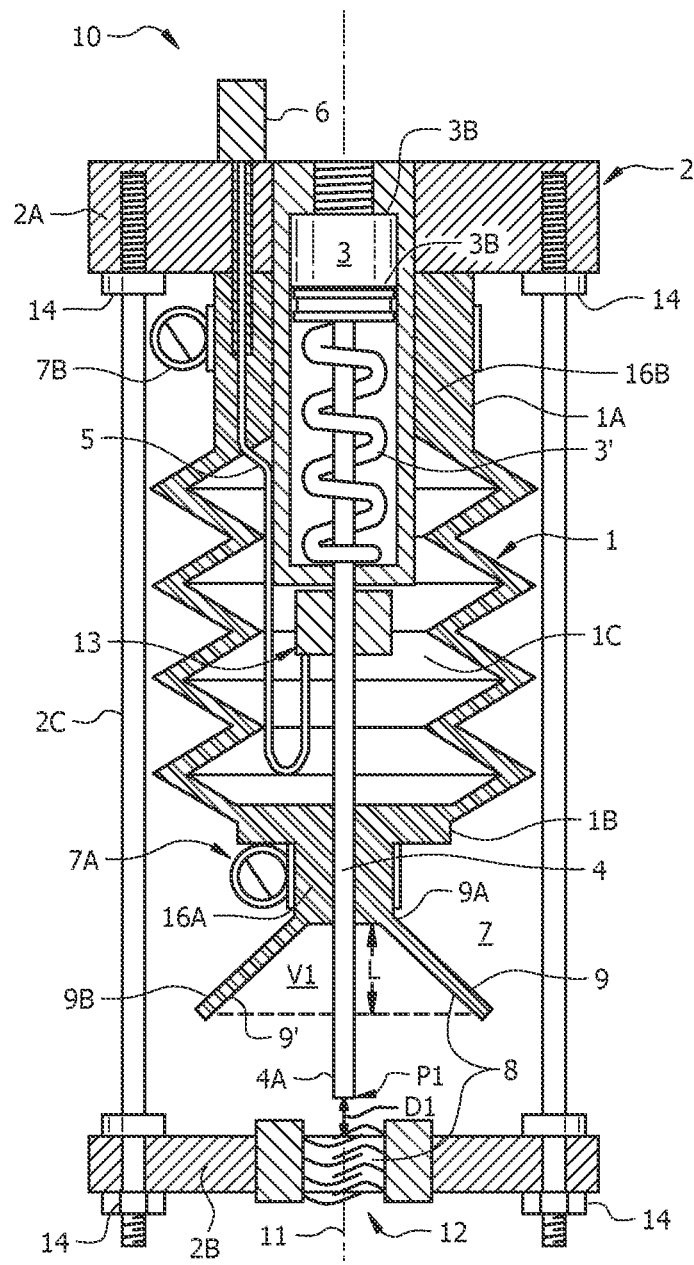
FIG. 1A is a schematic of a self-cleaning sensor, according to embodiments of this disclosure, in a retracted configuration.
Figure 1B:
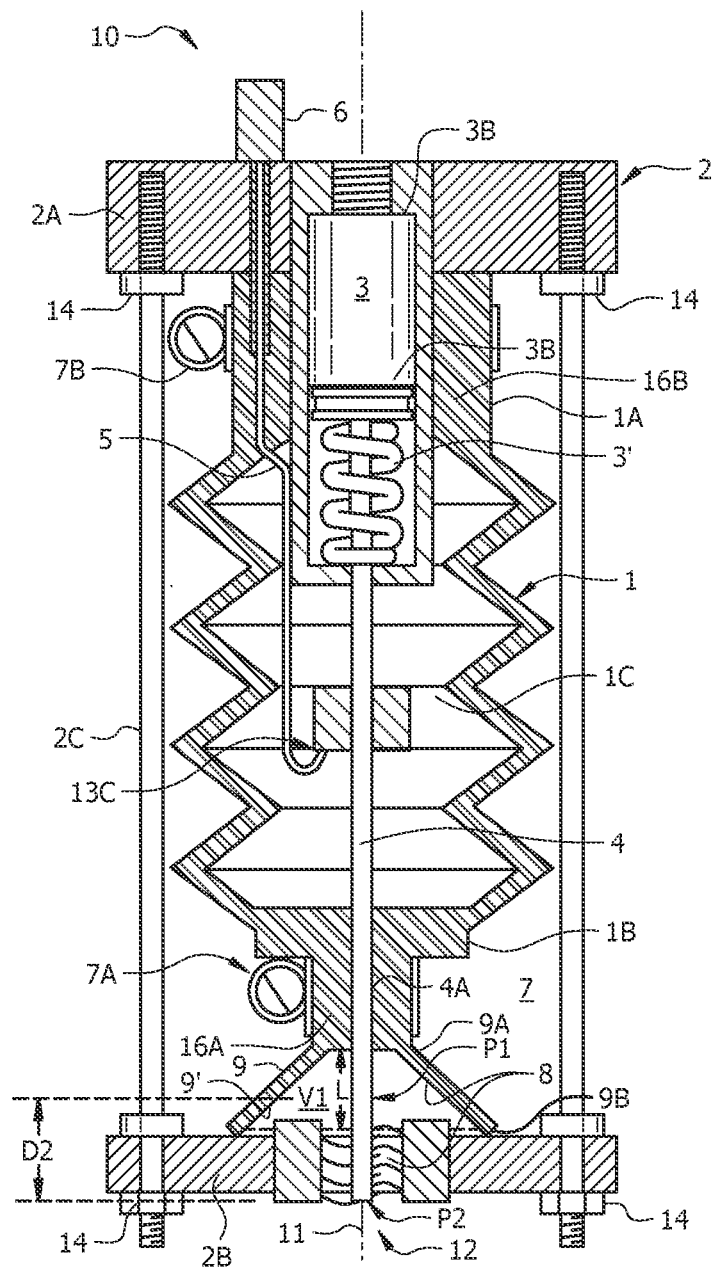
FIG. 1B is a schematic of a self-cleaning sensor, according to embodiments of this disclosure, in a partially extended configuration.
Figure 1C:
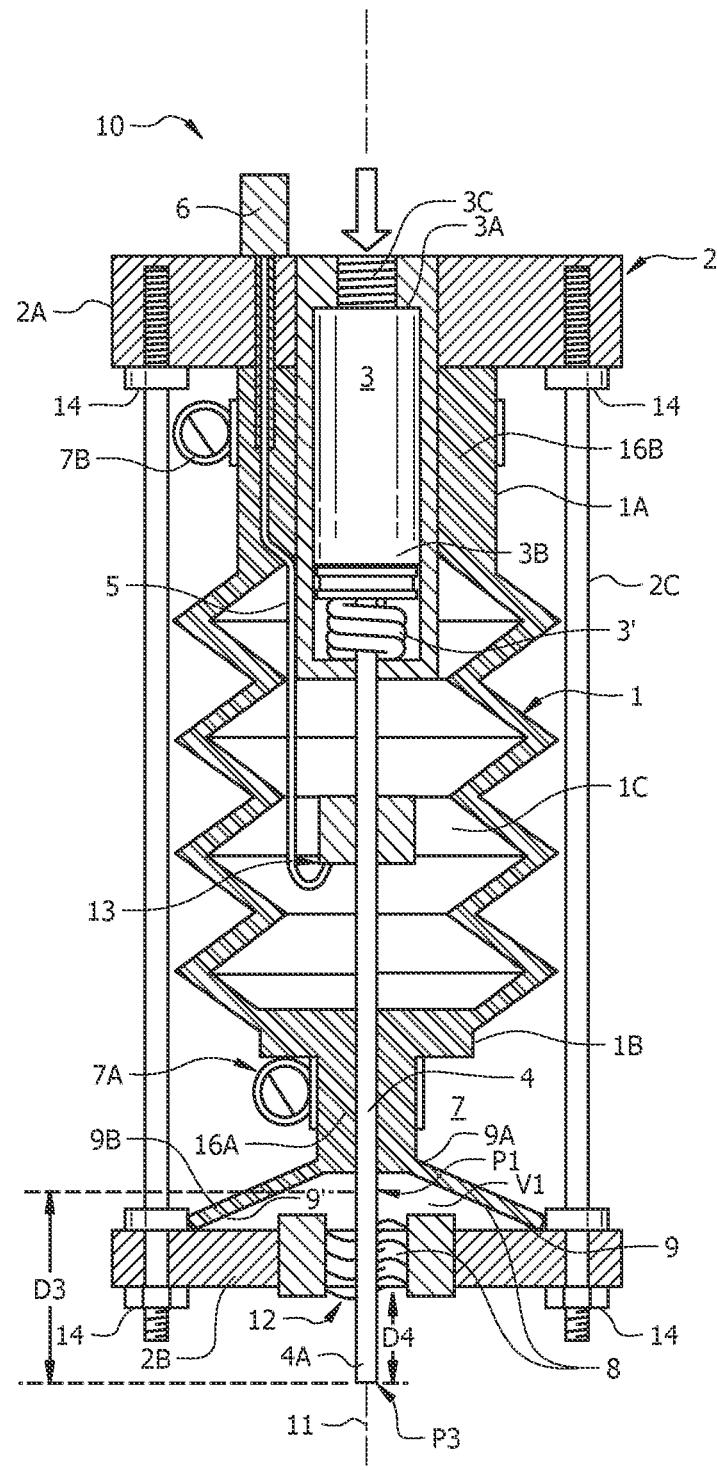
FIG. 1C is a schematic of a self-cleaning sensor, according to embodiments of this disclosure, in a fully extended configuration.

Description of a self-cleaning temperature sensor of this disclosure will now be made with reference to FIG. 1A, which is a schematic of a self-cleaning temperature sensor 10 (also referred to herein simply as a "self-cleaning sensor 10"), according to embodiments of this disclosure, in a retracted configuration. FIG. 11B, which is a schematic of the self-cleaning sensor 10 of FIG. 1A in a partially extended configuration, and FIG. 1C, which is a schematic of the self-cleaning sensor 10 of FIG. 1A in a fully extended configuration. Self-cleaning sensor 10 comprises: a bellows 1, a support structure 2, a pneumatic or hydraulic cylinder 3, a temperature sensor or probe 4 (also referred to hereinafter simply as "sensor 4"), sensor wires 5, and a self-cleaning system 8. Bellows 1 is coupled to the support structure 2, which is configured to support the bellows 1. In embodiments, the support structure 2 comprises a top 2A, the bottom 2B, and sides/walls 2C. The pneumatic or hydraulic cylinder 3 extends into the bellows 1. The temperature sensor or probe 4 is configured to measure a temperature of a fluid (7) and extends from the pneumatic or hydraulic cylinder 3, and comprises an exposure end 4A configured to contact the fluid 7 (e.g., a circulating fluid, such as a drilling mud) during sensing by the sensor 4. The sensor wires 5 are connected with the temperature sensor 4 and extend through an interior 1C of the bellows 1 to a control system 137 (FIG. 3), for example, via a control system connection 6. The control system connection 6 can be configured for communication with a control system 137, as descried further hereinbelow with reference to FIG. 3. Control system 6 can be a connection to BaraLogix™, available from Halliburton Energy Services. Houston, Texas, and/or a database, in embodiments. Self-cleaning system 8 comprises a hood 9 and a cleaning brush 12. Hood 9 can extend radially outward at least a portion of a distance along a central axis 11 (e.g., central axis 11 of temperature sensor 4 and/or of self-cleaning sensor 10) from a first end 9A of the hood 9 to a second end 9B of the hood 9. The hood 9 can define a first volume V1. The cleaning brush 12 can be integrated with or adjacent a bottom 2B of the support structure 2. In a retracted configuration of the self-cleaning sensor 10, as depicted in FIG. 1A, the exposure end 4A of the sensor 4 can be positioned at a retracted position P1 a distance D1 from cleaning brush 12. In a partially extended configuration of the self-cleaning sensor 10, as depicted in FIG. 1B, the exposure end 4A of the temperature sensor 4 can extend a distance D2 along the central axis 11 away from the fully retracted position P1 to partially extended position P2, while in a fully extended configuration of the self-cleaning sensor 10, as depicted in FIG. 1C, the exposure end 4A of the temperature sensor 4 can extend a distance D3 along the central axis 11 away from the fully retracted position P1 to fully extended position P3. In the fully extended configuration, such as depicted in the embodiment of FIG. 1C, hood 9 (and the volume, e.g., cone) defined thereby can be deformed to squeeze the fluid (e.g., mud) 7 through cleaning brush 12 and thus clean cleaning brush 12. In the extended configuration, such as depicted in FIG. 1C, the exposure end 4A of the temperature sensor 4 can be a distance D4 from cleaning brush 12 and/or bottom 2B of the support structure 2, such that the temperature sensor 4 extends beyond cleaning brush 12 and is substantially free from the thermal effects of the base plate/bottom 2B of support structure 2.

The bellows 1 can comprise a first end 1A and a second end 1B, and the first end 1A of the bellows 1 can be coupled to the top 2A of the support structure 2. In embodiments, the pneumatic or hydraulic cylinder 3 has a first end 3A coupled to the top 2A of the support structure 2, and a second end 3B extending into the bellows 1. The temperature sensor 4 can extend from the second end 3B of the pneumatic or hydraulic cylinder 3 and through a stabilizer 13. Stabilizer 13 can comprise, for example, a rubber gasket operable for passage of temperature sensor 4 therethrough, and for stabilization of the temperature sensor 4 during retraction and extension of the temperature sensor 4 from the retracted configuration of FIG. 1A to the extended configuration of FIG. 1B.

The sensor wires 5 are connected with the temperature sensor 4, and can extend from the stabilizer 13 through the interior 1C of the bellows 1 and the top 2A of the support structure 2 to control system 137, for example via control system connection 6, which can be adjacent the top 2A of the support structure 2.

The hood 9 can be conical or frustoconical in shape, or can be another shape, and can comprise walls 9' extending radially outward at least the portion of a length L along the central axis 11 from the first end 9A of the hood 9 to the second end 9B of the hood 9. The first volume defined by the hood 9 can comprise the region between the temperature sensor 4 and walls 9' of the hood 9 along length L. The first end 9A of the hood 9 can be coupled with the second end 1B of the bellows 1. The walls 9' can define a volume V1, that can be for example a cone or frustrum of a cone for fluid 7 through which temperature sensor 4 extends.

In embodiments, the first end 9A of the hood 9 is clamped via a first clamp 7A to the second end 1B of the bellows 1. For example, in embodiments, the first end 9A of the hood 9 further comprises or is clamped via first clamp 7A to a rubber gasket 16A through which the temperature sensor 4 extends along the central axis 11. A second clamp 7B can be clamped around the first end 1A of the bellows 1 or a component coupled therewith. For example, the first end 1A of the bellows 1 can comprise a rubber gasket 16B or can be coupled therewith, and second clamp 7B can be clamped around the gasket 16B.

As noted above, the bellows 1 can be configured to prevent fluid 7 entry into the interior 1C of the bellows 1, and thus protect the components interior to bellows 1 (e.g., the pneumatic or hydraulic cylinder 3, the portion of sensor 4 within interior 1C, the sensor wires 5 in interior 1C of bellows 1) from the circulating fluid 7.

Figure 2:
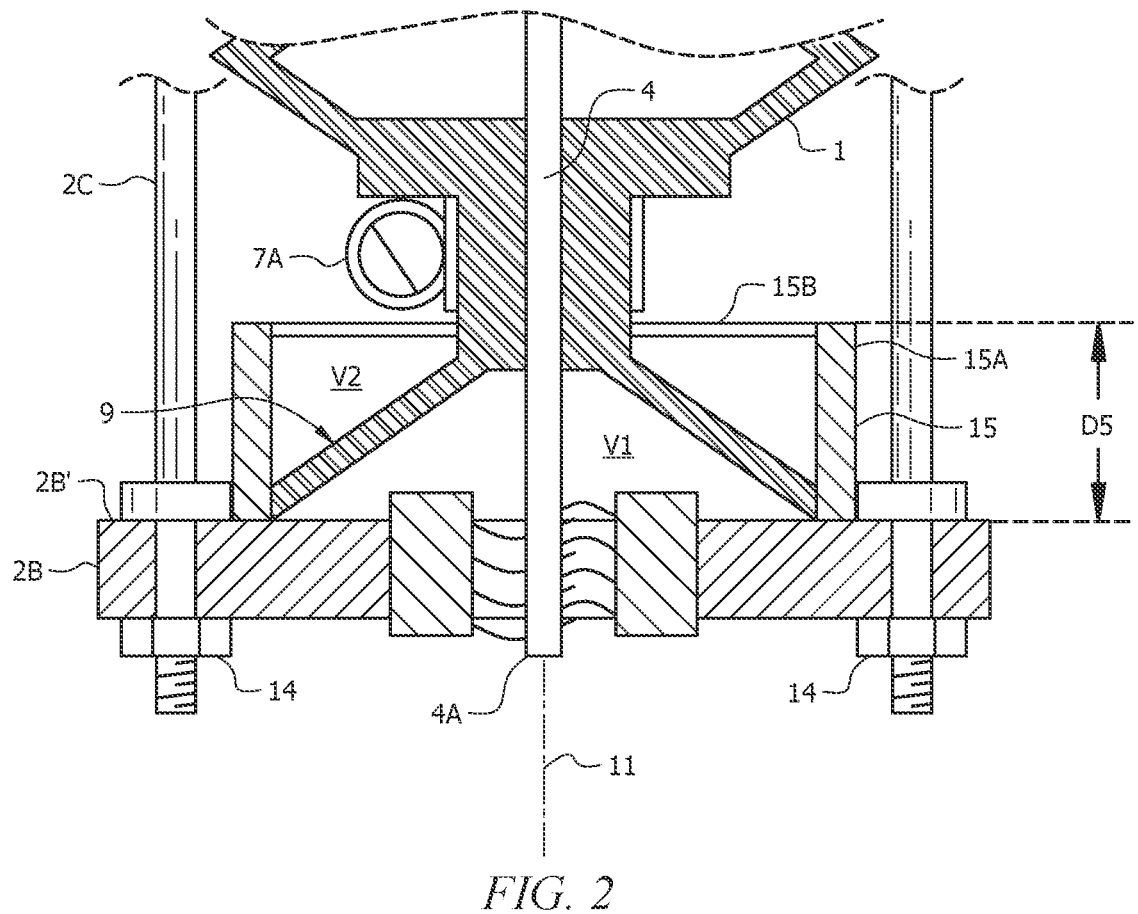
FIG. 2 is a schematic of a portion of a self-cleaning sensor, according to this disclosure.

The pneumatic or hydraulic cylinder 3 can further comprise a pneumatic or hydraulic cylinder inlet 3C in fluid communication with a first end 3A of the pneumatic or hydraulic cylinder 3, and connected to motive apparatus or "actuator" for moving exposure end 4A of the temperature sensor 4 from the retracted position to the extended position. Although the actuator could be electrical, a hydraulic or pneumatic actuator may be desirable from a safety standpoint. Accordingly, cylinder 3 is referred to herein as a "pneumatic or hydraulic cylinder". The exemplary cylinder 3 depicted in FIG. 1A to FIG. 2 is a spring return cylinder, that utilizes only a single hydraulic or air-line thereto and spring 3' for return. In alternative or additional embodiments, cylinder 3 can be a cylinder that can be hydraulically actuated in both directions, and thus is not limited to cylinder 3 depicted in the figures.

Connectors 14 can be configured for connecting sides 2C of the support structure 2 to the top 2A of the support structure 2 and to the bottom 2B of the support structure 2. In embodiments, connectors 14 can comprise screws, clamps, pins, or another suitable connector.

With reference to FIG. 2, which is a schematic of a portion of a self-cleaning sensor 10, according to this disclosure, the self-cleaning sensor 10 of this disclosure can further comprise a tube 15. Tube 15 can be operable to improve a pumping action of self-cleaning sensor 10 by increasing a volume of fluid 7 passed through cleaning brush 12 during movement of sensor 4 from the retracted configuration depicted in FIG. 1A to the extended configuration depicted in FIG. 1B and back. Tube 15 comprises sides 15A and a top 15B extending a distance D3 from a top 2B' of bottom 2B of the support structure 2 along the central axis 11 toward top 2A of the support structure 2. Tube 15 can provide an additional volume V2, comprising the volume between walls 9' of the hood and the sides 15A and the top 15B of the tube 15, such that, when extending from the retracted configuration to the extended configuration, a total volume equal to a portion of the sum of the first volume V1 and the additional volume V2 can be pushed through cleaning brush 12, increasing the self-cleaning of the exposure end 4A of the temperature sensor 4 and of the cleaning brush 12. The increased volume provided by tube 15 can provide for increased gel breaking during cycling of the self-cleaning sensor 10 from the extracted configuration to the extended configuration and back a plurality of times. In embodiments employing tube 15, the additional volume V2 of fluid provided by tube 15 may be such that exposure end 4A of the temperature sensor 4 moves a smaller distance D3 from retracted position P1 to the fully extended position P3 in order to provide sufficient fluid 7 flow through cleaning brush 12, and hood (e.g., cone) 9 need not be deformed to such a degree during operation of self-cleaning sensor 10.

According to this disclosure, a self-cleaning sensor 10 of this disclosure can be employed in a drilling system. Such a drilling system can comprise a mud pit 132 and at least one self-cleaning sensor 10 of this disclosure. With reference now to FIG. 4, which is a schematic of a drilling system 100, according to one or more embodiments of this disclosure, some embodiments described herein may include a wellbore assembly, such as a drilling assembly or system 100. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure. Although referred to herein with respect to FIG. 4 as a drilling assembly and a drilling operation employing a drilling fluid wellbore servicing fluid (WSF) 122, a self-cleaning sensor 10 and method of this disclosure can be utilized, in alternative embodiments, during non-drilling well bore servicing operations, to determine the temperature of circulating wellbore servicing fluids other than drilling fluids. In such embodiments, the circulating fluid 7 that contacts self-cleaning sensor 10 during measurement of the fluid temperature comprises at least a portion of the circulating drilling fluid 122 or particulate-reduced drilling fluid WSF 124.

As illustrated in FIG. 3, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 111 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a wellbore 116 that penetrates various subterranean formations 118.

A pump 129 (e.g., a mud pump) circulates drilling fluid or other WSF 122 (referred to simply hereinafter with reference to FIG. 3 as a "drilling fluid 122") through a feed pipe 133 and to the kelly 111, which conveys the drilling fluid 122 downhole through the interior of the drill string 108 and through one or more orifices in the drill bit 114. The drilling fluid 122 is then circulated back to the surface via an annulus 135 defined between the drill string 108 and the walls of the wellbore 116. At the surface, the recirculated or spent drilling fluid 122 exits the annulus 135 and may be conveyed to one or more fluid processing unit(s) including separator 128 via an interconnecting flow line 131. After passing through the fluid processing unit(s) including separator 128, a "cleaned" or particulate-reduced drilling fluid WSF 124 can be deposited into a nearby retention pit 132 (i.e., a mud pit). While illustrated as being arranged at the outlet of the wellbore 116 via the annulus 135, those skilled in the art will readily appreciate that the fluid processing unit(s) or separator 128 may be arranged at any other location in the drilling assembly 100 to facilitate its proper function, without departing from the scope of the scope of the disclosure. In embodiments, for example, there can be more than one retention pit 132, such as multiple retention pits 132 in series. Moreover, the retention pit 132 may be representative of one or more fluid storage facilities and/or units where the temperature of the circulating fluid 7 (e.g., drilling fluid 122, particle reduced drilling fluid 124) may be measured utilizing the herein disclosed self-cleaning temperature sensor 10.

The fluid processing unit(s) including separator 128 may include, but are not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment.

System 100 can further include a processing or control apparatus 137 (e.g., a computer) including a processor 138 and a memory 139 operable to employ the temperature measured with the self-cleaning sensor 10.

Having described FIG. 3, a system 100 of this disclosure can thus include: a wellbore 116 in which a circulating wellbore servicing fluid (WSF) 122 is circulated during a wellbore operation, a separator 128 (e.g., a shaker (e.g., shale shaker), a screen, a centrifuge, a hydrocyclone, a magnetic separator, an electrical separator, a desilter, a desander, a filter (e.g., diatomaceous earth filters), or another solids separation device) configured to remove solids from the circulating WSF 122, thereby separating the particles into screened particles 123 having a diameter greater than or equal to a mesh size that are separated from the circulating fluid 122 via the separator 128, and retained particles having a diameter less than the mesh size; a processor 138; and a memory 139, which can include various algorithms or models for calculating one or more parameters from the measured temperature. The algorithm or model, when executed on the processor 138, can configure the processor 138 to: receive data (e.g., including temperature of the circulating fluid (e.g., the WSF 122/124) measured with the self-cleaning sensor 10), and determine an operating parameter of the circulating fluid system of drilling system 100.

One or more self-cleaning sensors 10 can be positioned within the mud pit, or external thereto, as will be described hereinbelow with reference to FIG. 4A, FIG. 4B, and FIG. 4C, which are schematics of a portion of drilling system 100 comprising a mud pit 132 and a self-cleaning temperature sensor 10 of this disclosure.

As depicted in FIG. 4A, in embodiments, self-cleaning sensor 10 can be positioned within a mud pit 132. For example, in embodiments, a self-cleaning sensor 10 of this disclosure can be positioned along a midline M of the mud pit 132, wherein the midline M extends about midway between a top T and a bottom B of the mud pit 132. In embodiments, the at least one self-cleaning sensor 10 can be positioned proximal an inlet I of the mud pit 132, wherein the inlet I is an inlet for fluid 7 into the mud pit 132. Alternatively or additionally, a self-cleaning sensor 10 of this disclosure can be positioned proximal an outlet O of the mud pit 132, wherein the outlet O of the mud pit 132 is an outlet for fluid 7 from the mud pit 132. Alternatively or additionally, a self-cleaning sensor 10 of this disclosure can be positioned between the inlet I and the outlet O of the mud pit 132. In the embodiment of FIG. 4A, self-cleaning sensor 10 is positioned along the midline of the mud pit 132, (e.g., approximately equidistantly) between the inlet I and the outlet O of the mud pit 132. In embodiments, the self-cleaning sensor 10 can be positioned on or near/adjacent a wall S of the mud pit 132. The self-cleaning sensor 10 can be positioned deeply enough into mud pit 132 such that the thermal conductivity sensor 4 has fluid 7 covering it during operation. The self-cleaning sensor 10 can be positioned a distance from any mixers also positioned within the mud pit 132.

As depicted in FIG. 4B and FIG. 4C, in embodiments, a self-cleaning sensor 10 of this disclosure can be contained within a vessel 140 upstream (FIG. 4B) or downstream (FIG. 4C) of mud pit 132. In this manner, a temperature of the returning circulating fluid can be diverted, upstream of mud pit 132, to vessel 140, for example, via line 131', the circulating fluid temperature can be measured within the vessel 140, and the fluid circulated from the vessel 140 to mud pit, for example, via line 131", as shown in FIG. 4B. Alternatively or additionally, a temperature of the returning circulating fluid can be diverted, downstream of mud pit 132, to vessel 140, for example, via line 141', the circulating fluid temperature can be measured within the vessel 140, and the fluid circulated from the vessel 140 to the mud pump(s) 129, for example, via line 141", as shown in FIG. 4C.

According to embodiments of this disclosure, a drilling system 100 can comprise: a mud pit 132 containing therein at least one self-cleaning sensor 10 of this disclosure. The at least one self-cleaning sensor 10 can be coupled with the control system 137. The control system 137 can be operable to utilize a temperature determined and/or received via the self-cleaning sensor 10 to adjust operation of one or more mud pumps 129 of a mud circulation system of the drilling system 100.

A method of this disclosure can comprise: positioning a self-cleaning sensor 10 of this disclosure into a fluid 7 (e.g., a circulating fluid, such as circulating drilling fluid 122/124); extending the temperature sensor 4 from the retracted configuration to the extended configuration such that exposure end 4A of the temperature sensor 4 is cleaned via passage through the cleaning brush 12 and passage, of at least a portion of the first volume V1 of the fluid 7 through the cleaning brush 12 breaks gels, if present, in the fluid 7; measuring a temperature of the fluid 7 in real time with the self-cleaning sensor 10; and communicating the measured temperature of the fluid 7 in real time to the control system 137. The method can further comprise adjusting an operating parameter of a drilling system (e.g., an operating parameter of a mud circulation system) via the control system 137 based on the measured temperature. For example, in embodiments, the control system 137 utilizes the measured temperature of the fluid 7 in mud put 132 to calculate a volume and/or mass of the mud pit 132.

In embodiments, the method can further comprise utilizing the calculated volume and/or mass of the mud pit 132 for event detection. For example, in embodiments, mud pit temperature trending can be utilized as a kick or blowout detection mechanism by accurately calculating the mass of fluid in the mud pit 132 and comparing the changes to the historical pump rate and hole volume. Calculating the actual mass in the mud pit 132 requires accurate temperature measurements to reliably detect any unexpected increase in mud mass, since pit level (e.g., volume) measurements alone can be insufficient. Accurate mud pit temperature measurements obtained via the self-cleaning sensor 10 can also be utilized to help detect slower fluid losses, in embodiments. For example, an increase in temperature (an increasing trend or a spike) or a decrease in temperature (a decreasing trend or valley) measured with self-cleaning sensor 10 could indicate a water, oil, gas, and/or solids increase or decrease in the circulating fluid 7. The changes in temperature can be utilized to detect events and/or adjust rheology and density of the circulating fluid to address the issue.

In embodiments, a method of this disclosure comprises: regularly measuring a temperature of a fluid 7 in a mud pit 132 in real time with a self-cleaning sensor 10 of this disclosure by: exposing the exposure end 4A of the temperature sensor 4 to the fluid 7; and measuring the temperature of the fluid 7 with the self-cleaning sensor 10; and communicating the measured temperature to the control system 137. The method can further comprise utilizing the measured temperature for monitoring and/or controlling operation of a mud circulation system. For example, monitoring and/or controlling can comprise utilizing the measured temperature to calculate a mud pit volume and/or mass in real time. In embodiments, the method can further comprise utilizing the calculated mud pit volume and/or mass for event detection, as noted hereinabove.

The real time temperature determined and/or received via the self-cleaning sensor 10 can be utilized, for example, to control operation of a drilling system to prevent over pressurization or under pressurization of a wellbore being drilled.

The method can further comprise, prior to measuring the temperature of the fluid 7 with the self-cleaning sensor 10: cleaning the exposure end 4A of the temperature sensor 4 and breaking gels local to the exposure end 4A, if present, in the fluid 7 by extending and retracting the temperature sensor 4 from the retracted position to the extended position and back a plurality of times. The number of times the self-cleaning sensor 10 is cycled from the retracted configuration to the extended configuration, the first volume V1 and/or the additional volume V2 provided by the hood 9 and the tube 15, respectively, a speed of the cycling from the retracted configuration to the extended configuration, or vice versa, and back, or a combination thereof can be adjusted to provide cleaning of the exposure end 4A of the temperature sensor 4 and/or the cleaning brush 12 and/or a desired amount of gel breaking in the fluid 7 local to the exposure end 4A of the sensor 4.

In embodiments, the method further comprises determining the thermal conductivity of the fluid 7 in the mud pit 132, for example, via a conventional thermal conductivity sensor, and/or via a self-cleaning thermal conductivity sensor as described in U.S. Patent Application Publication No. 2024/0133754 A1, entitled, "Self-Cleaning Thermal Conductivity Sensor For Use in a Mud Pit", the disclosure of which is hereby incorporated herein in its entirety for purposes not contrary to this disclosure.

As noted hereinabove, accurate mud pit temperature measurements are important for real time modeling of the thermal and pressure analysis of a wellbore while drilling. Conventionally, circulating fluid (e.g., in a mud pit) temperature measurements are dependent on either mud engineers actually making the measurement or an inadequate temperature sensor that can foul with caked mud or be placed in a pit location with gelling mud around it. For the mud temperature measurements to be useful in real time they must be repeated frequently and accurately.

The temperature sensor 10 of this disclosure provides for real time measurement of the temperature of a circulating fluid 7. The temperature sensor 10 of this disclosure is self-cleaning. As noted hereinabove, passage of exposure end 4A of self-cleaning sensor 4 through cleaning brush 12 can serve to clean any gelled mud 17 therefrom. Additionally, any gels formed in the circulating fluid 7 proximate the exposure end 4A of self-cleaning sensor 4 can be broken via repeated cycling of self-cleaning sensor 10 from the retracted configuration (FIG. 1A) to the extended configuration (FIG. 1B) and back. By breaking the gels in the gelled circulation fluid (gelled mud) 7, such pumping mechanism can be utilized to improve an accuracy of the temperature measurement. Additionally, the cleaning brush 12 utilized to clean the temperature sensor 4 can be automatically cleaned as well during cleaning of the exposure end 4A of the temperature sensor 4. Circulating fluid (e.g. drilling mud) 7 can be pumped through the cleaning brush 12 via the cycling of the self-cleaning sensor 10 from the retracted configuration (FIG. 1A) to the extended configuration (FIG. 1B) and back.

In embodiments, the self-cleaning sensor 10 provides accurate mud pit 132 temperature measurements in real time. The temperature measurements can be utilized with the diluent recovery unit (DRU) system to improve the calculated pit volume (and thus mass) with respect to time, which can then be employed for event detection.

Other advantages will be apparent to those of skill in the art and with the help of this disclosure.

Additional Disclosure

The following are non-limiting, specific embodiments in accordance with the present disclosure:

In a first embodiment, a self-cleaning sensor (10) comprises: a bellows (1) coupled to a support structure (2), wherein the support structure (2) is configured to support the bellows (1); a pneumatic or hydraulic cylinder (3) extending into the bellows (1); a sensor (4) configured to measure a temperature of a fluid (7) and extending from the pneumatic or hydraulic cylinder (3), wherein the sensor (4) comprises an exposure end (4A) configured to contact the fluid (7) during sensing by the sensor (4); sensor wires (5) connected with the sensor (4) and extending through an interior (1C) of the bellows (1) to a control system connection (6), wherein the control system connection (6) is configured for communication with a control system (137; FIG. 3); and a self-cleaning system (8) comprising: a hood (9) extending radially outward at least a portion of a distance along a central axis (11) from a first end 9A of hood (9) to a second end (9B) of the hood (9), wherein the hood (9) defines a first volume (V1); and a cleaning brush (12) integrated with or adjacent a bottom (2B) of the support structure (2), wherein, in a retracted configuration of the self-cleaning sensor (10), the exposure end (4A) of the sensor (4) is positioned at a retracted position a distance D1 from cleaning brush 12, and, in an extended configuration of the self-cleaning sensor (10), the exposure end (4A) of the sensor (4) extends a distance D2 along the central axis (11) away from the retracted position to an extended position.

A second embodiment can include the self-cleaning sensor (10) of the first embodiment: wherein the support structure (2) comprises a top (2A), a bottom (2B), and sides/walls (2C), wherein the bellows (1) comprises a first end (1A) and a second end (1B), wherein the first end (1A) of the bellows (1) is coupled to the top (2A) of the support structure (2), and; wherein the pneumatic or hydraulic cylinder (3) has a first end (3A) coupled to the top (2A) of the support structure (2), and a second end (3B) extending into the bellows (1); wherein the sensor (4) extends from the second end (3B) of the pneumatic or hydraulic cylinder (3) and through a stabilizer (13); wherein the sensor wires (5) connected with the sensor (4) extend from the stabilizer (13) through the interior (1C) of the bellows (1) and the top (2A) of the support structure (2) to the control system connection (6); and wherein the hood (9) comprises walls (9') extending radially outward at least the portion of a length (L) along the central axis (11) from the first end (9A) of hood (9) to the second end (9B) of the hood (9), wherein the first end (9A) of the hood (9) is coupled with a second end (1B) of the bellows (1).

A third embodiment can include the self-cleaning sensor (10) of the second embodiment, wherein the first end (9A) of the hood (9) is clamped via a first clamp (7A) to the second end (1B) of the bellows (1), and/or further comprising a second clamp (7B) around the first end (1A) of the bellows (1).

A fourth embodiment can include the self-cleaning sensor (10) of the third embodiment, wherein the first end (9A) of the hood (9) further comprises or is coupled with a rubber gasket (16) through which the sensor (4) extends along the central axis (11).

A fifth embodiment can include the self-leaning sensor (10) of any one of the first to fourth embodiments, wherein the bellows (1) is configured to prevent fluid entry into the interior (1C) of the bellows (1).

A sixth embodiment can include the self-cleaning sensor (10) of any one of the first to fifth embodiments, wherein the pneumatic or hydraulic cylinder (3) further comprises a pneumatic or hydraulic cylinder inlet (3C) in fluid communication with a first end (3A) of the pneumatic or hydraulic cylinder (3).

A seventh embodiment can include the self-cleaning sensor (10) of any one of the first to sixth embodiments further comprising connectors (14) for connecting sides (2C) of the support structure (2) to a top (2A) of the support structure (2) and to a bottom (2B) of the support structure (2).

An eighth embodiment can include the self-cleaning sensor (10) of any one of the first to seventh embodiments further comprising a tube (15) comprising sides (15A) and a top (15B) extending a distance D3 from a top (2B') of a bottom (2B) of the support structure (2) along the central axis (11) toward a top (2A) of the support structure (2), and providing an additional volume (V2), whereby, when extending from the retracted configuration to the extended configuration, a total volume equal to a portion of the sum of the first volume (V1) and the additional volume (V2) is pushed through cleaning brush (12).

In a ninth embodiment, a system comprises a mud pit (132) and at least one self-cleaning sensor (10) of any one of the first to eighth embodiments.

A tenth embodiment can include the system of the ninth embodiment, wherein the at least one self-cleaning sensor (10) comprises: a self-cleaning sensor (10) of any one of the first to eighth embodiments positioned along a midline (M) of the mud pit (132), wherein the midline (M) extends about midway between a top (T) and a bottom (B) of the mud pit (132).

An eleventh embodiment can include the system of the ninth or the tenth embodiment, wherein the at least one self-cleaning sensor (10) comprises: a self-cleaning sensor (10) according to any of the first to eighth embodiments positioned proximal an inlet (I) of the mud pit (132), wherein the inlet (I) is an inlet for fluid (7) into the mud pit (132); a self-cleaning sensor (10) of any one of the first to eighth embodiments positioned proximal an outlet (O) of the mud pit (132), wherein the outlet (O) of the mud pit (132) is an outlet for fluid (7) from the mud pit (132); and/or a self-cleaning sensor (10) of any one of the first to eighth embodiments positioned between the inlet (1) and the outlet (O) of the mud pit (132).

In a twelfth embodiment, a drilling system 100 comprises: a mud pit (132) containing therein at least one self-cleaning sensor (10) according to any one of the first to eighth embodiments, wherein the at least one self-cleaning sensor (10) is coupled with the control system (137), wherein the control system (137) is operable to utilize a temperature received via the self-cleaning sensor (10) to adjust operation of one or more pumps (129) of a mud circulation system of the drilling system 100.

In a thirteenth embodiment, a method comprises: positioning a self-cleaning sensor (10) according to one of the first to eighth embodiments into a fluid (7); extending the sensor (4) from the retracted configuration to the extended configuration, such that exposure end (4A) of the sensor (4)

is cleaned via passage through the cleaning brush (12) and such that passage of at least a portion of the first volume (V1) of the fluid (7) through the cleaning brush (12) breaks gels, if present, in the fluid (7); measuring a temperature of the fluid (7) in real time with the self-cleaning sensor (10); and communicating the measured temperature of the fluid (7) in real time to the control system (137).

A fourteenth embodiment can include the method of the thirteenth embodiment further comprising adjusting an operating parameter of a drilling system 100 (e.g., an operating parameter of a mud circulation system of the drilling system 100) via the control system 137 based on the measured temperature.

A fifteenth embodiment can include the method of the fourteenth embodiment, wherein the control system (137) utilizes the measured temperature of the fluid (7) in the mud put (132) to calculate a volume and/or mass of the mud pit (132).

A sixteenth embodiment can include the method of the fifteenth embodiment further comprising utilizing the calculated volume and/or mass of the mud pit (132) for event detection.

In a seventeenth embodiment, a method comprises: regularly measuring a temperature of a fluid (7) in a mud pit (132) in real time with a self-cleaning sensor (10) of this disclosure by: exposing the exposure end (4A) of the sensor (4) to the fluid (7); measuring the temperature of the fluid (7) with the self-cleaning sensor (10); and communicating the measured temperature to the control system (137).

An eighteenth embodiment can include the method of the seventeenth embodiment further comprising utilizing the measured temperature for monitoring and/or controlling operation of a mud circulation system.

A nineteenth embodiment can include the method of the eighteenth embodiment, wherein monitoring and/or controlling comprises utilizing the measured temperature to calculate a mud pit volume and/or mass in real time.

A twentieth embodiment can include the method of the nineteenth embodiment further comprising utilizing the calculated mud pit volume and/or mass for event detection.

A twenty first embodiment can include the method of any one of the seventeenth to twentieth embodiments further comprising utilizing the real time measure temperature to control operation of a drilling system to prevent over pressurization or under pressurization of a wellbore being drilled.

A twenty second embodiment can include the method of any one of the seventeenth to twenty first embodiments further comprising, prior to measuring the temperature of the fluid (7) with the self-cleaning sensor (10): cleaning the exposure end (4A) of the sensor (4) and breaking gels local to the exposure end (4A) of the sensor (4), if present, in the fluid (7) by extending and retracting the sensor (4) from the retracted configuration to the extended configuration and back a plurality of times.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A self-cleaning temperature sensor comprising:
   a bellows coupled to a support structure, wherein the support structure is configured to support the bellows;
   a pneumatic or hydraulic cylinder extending into the bellows;
   a sensor configured to measure a temperature of a fluid and extending from the pneumatic or hydraulic cylinder, wherein the sensor comprises an exposure end configured to contact the fluid during sensing by the sensor;
   sensor wires connected with the sensor and extending through an interior of the bellows to a control system connection, wherein the control system connection is configured for communication with a control system; and
   a self-cleaning system comprising:
     a hood extending radially outward at least a portion of a distance along a central axis from a first end of the hood to a second end of the hood, wherein the hood defines a first volume; and
     a cleaning brush integrated with or adjacent a bottom of the support structure,
   wherein, in a retracted configuration of the self-cleaning sensor, the exposure end of the sensor is positioned at a retracted position a distance from cleaning brush, and, in an extended configuration of the self-cleaning sensor, the exposure end of the sensor extends a distance along the central axis away from the retracted position.

2. The self-cleaning sensor of claim 1:
wherein the support structure comprises a top, the bottom, and sides/walls, and wherein the bellows comprises a first end and a second end, wherein the first end of the bellows is coupled to the top of the support structure;
wherein the pneumatic or hydraulic cylinder has a first end coupled to the top of the support structure, and a second end extending into the bellows;
wherein the sensor extends from the second end of the pneumatic or hydraulic cylinder and through a stabilizer;
wherein the sensor wires connected with the sensor extend from the stabilizer through an interior of the bellows and the top of the support structure to the control system connection; and
wherein the hood comprises walls extending radially outward at least the portion of a distance along the central axis from the first end of the hood to the second end of the hood, wherein the first end of the hood is coupled with the second end of the bellows.

3. The self-cleaning sensor of claim 2, wherein the first end of the hood is clamped via a first clamp to the second end of the bellows, and/or further comprising a second clamp around the first end of the bellows or around a gasket coupled therewith.

4. The self-cleaning sensor of claim 3, wherein the first end of the hood further comprises or is coupled with a rubber gasket through which the sensor extends along the central axis.

5. The self-cleaning-sensor of claim 1, wherein the bellows is configured to prevent fluid entry into the interior of the bellows.

6. The self-cleaning sensor of claim 1, wherein the pneumatic or hydraulic cylinder further comprises a pneumatic or hydraulic cylinder inlet in fluid communication with a first end of the pneumatic or hydraulic cylinder.

7. The self-cleaning sensor of claim 1 further comprising connectors for connecting sides of the support structure to a top of the support structure and to a bottom of the support structure.

8. The self-cleaning sensor of claim 1 further comprising a tube comprising sides and a top extending a distance from a top of a bottom of the support structure along the central axis toward a top of the support structure, and providing an additional volume, whereby, when extending from the retracted configuration to the extended configuration, a total volume equal to a portion of the sum of the first volume and the additional volume is pushed through cleaning brush.

9. The self-cleaning sensor of claim 1 positioned in a mud pit.

10. The self-cleaning sensor of claim 9, wherein the self-cleaning sensor is:
positioned along a midline of the mud pit, wherein the midline extends about midway between a top and a bottom of the mud pit
positioned proximal an inlet of the mud pit, wherein the inlet is an inlet for fluid into the mud pit;
positioned proximal an outlet of the mud pit, wherein the outlet of the mud pit is an outlet for fluid from the mud pit; and/or
positioned between the inlet and the outlet of the mud pit.

11. A method comprising:
positioning a self-cleaning sensor into a fluid, wherein the self-cleaning sensor comprises: a bellows coupled to a support structure, wherein the support structure is configured to support the bellows; a pneumatic or hydraulic cylinder extending into the bellows; a sensor configured to measure a temperature of a fluid and extending from the pneumatic or hydraulic cylinder, wherein the sensor comprises an exposure end configured to contact the fluid during sensing by the sensor; sensor wires connected with the sensor and extending through an interior of the bellows to a control system connection, wherein the control system connection is configured for communication with a control system; and a self-cleaning system comprising: a hood extending radially outward at least a portion of a distance along a central axis from a first end of the hood to a second end of the hood, wherein the hood defines a first volume; and a cleaning brush integrated with or adjacent a bottom of the support structure, wherein, in a retracted configuration of the self-cleaning sensor, the exposure end of the sensor is positioned at a retracted position a distance from cleaning brush, and, in an extended configuration of the self-cleaning sensor, the exposure end of the sensor extends a distance along the central axis away from the retracted position;
extending the sensor from the retracted configuration to the extended configuration such that exposure end of the sensor is cleaned via passage through the cleaning brush and passage, of at least a portion of the first volume of the fluid through the cleaning brush breaks gels, if present, in the fluid;
measuring a temperature of the fluid in real time with the self-cleaning sensor; and
communicating the measured temperature of the fluid in real time to the control system.

12. The method of claim 11 further comprising adjusting an operating parameter of a drilling system via the control system based on the measured temperature.

13. The method of claim 12, wherein the control system utilizes the measured temperature of the fluid in the mud pit to calculate a volume and/or mass of the mud pit.

14. The method of claim 13 further comprising utilizing the calculated volume and/or mass of the mud pit for event detection.

15. A method comprising:
regularly measuring a temperature of a fluid in a mud pit in real time with a self-cleaning sensor by:
exposing an exposure end of the sensor to the fluid;
measuring the temperature of the fluid with the self-cleaning sensor; and
communicating the measured temperature to the control system,
wherein the self-cleaning sensor comprises:
a bellows coupled to a support structure, wherein the support structure is configured to support the bellows;
a pneumatic or hydraulic cylinder extending into the bellows;
a sensor configured to measure a temperature of a fluid and extending from the pneumatic or hydraulic cylinder, wherein the sensor comprises the exposure end, wherein the exposure end is configured to contact the fluid during sensing by the sensor;
sensor wires connected with the sensor and extending through an interior of the bellows to a control system connection, wherein the control system connection is configured for communication with a control system; and
a self-cleaning system comprising:
a hood extending radially outward at least a portion of a distance along a central axis from a first end of the hood to a second end of the hood, wherein the hood defines a first volume; and a cleaning brush integrated with or adjacent a bottom of the support structure, wherein, in a retracted configuration of the self-cleaning sensor, the exposure end of the sensor is positioned at a retracted position a distance from cleaning brush, and, in an extended configuration of the self-cleaning sensor, the exposure end of the sensor extends a distance along the central axis away from the retracted position.

16. The method of claim 15 further comprising utilizing the measured temperature for monitoring and/or controlling operation of a mud circulation system.

17. The method of claim 16, wherein monitoring and/or controlling comprises utilizing the measured temperature to calculate a mud pit volume and/or mass in real time.

18. The method of claim 17 further comprising utilizing the calculated mud pit volume and/or mass for event detection.

19. The method of claim 15 further comprising utilizing the real time measure temperature to control operation of a drilling system to prevent over pressurization or under pressurization of a wellbore being drilled.

20. The method of claim 15 further comprising, prior to measuring the temperature of the fluid with the self-cleaning sensor:

cleaning the exposure end of the sensor and breaking gels local to the exposure end of the sensor, if present, in the fluid by extending and retracting the sensor from the retracted configuration to the extended configuration and back a plurality of times.

* * * * *